(12) United States Patent
Park

(10) Patent No.: US 11,539,475 B2
(45) Date of Patent: Dec. 27, 2022

(54) METHOD AND APPARATUS FOR TRANSMITTING SIDELINK HARQ FEEDBACK INFORMATION

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 147 days.

(21) Appl. No.: 16/732,868

(22) Filed: Jan. 2, 2020

(65) Prior Publication Data

US 2020/0220669 A1 Jul. 9, 2020

(30) Foreign Application Priority Data

Jan. 4, 2019 (KR) .................. 10-2019-0001402
Dec. 6, 2019 (KR) .................. 10-2019-0161978

(51) Int. Cl.
*H04L 1/18* (2006.01)

(52) U.S. Cl.
CPC .......... *H04L 1/1861* (2013.01); *H04L 1/1864* (2013.01)

(58) Field of Classification Search
CPC ... H04W 28/04; H04W 72/04; H04W 72/042; H04W 88/08; H04L 5/0007; H04L 1/1864; H04L 1/1861
USPC ........................................................ 370/329
See application file for complete search history.

(56) References Cited

U.S. PATENT DOCUMENTS

| 2013/0315124 | A1* | 11/2013 | Rapaport | ............ | H04W 72/042 370/312 |
| 2019/0053251 | A1* | 2/2019 | Loehr | .................... | H04W 72/10 |
| 2019/0174530 | A1* | 6/2019 | Kim | ........................ | H04L 1/0025 |
| 2019/0364588 | A1* | 11/2019 | Lu | .......................... | H04W 88/08 |
| 2020/0029318 | A1* | 1/2020 | Guo | ........................ | H04L 1/1819 |
| 2020/0112400 | A1* | 4/2020 | Lee | .................... | H04W 72/0473 |
| 2020/0136760 | A1* | 4/2020 | Hahn | ..................... | H04L 5/0007 |

(Continued)

FOREIGN PATENT DOCUMENTS

| CN | WO 2018171540 A1 * 11/2018 | .......... H04L 1/1822 |
| KR | WO 2013066136 A1 * 5/2013 | .......... H04L 5/0053 |

(Continued)

OTHER PUBLICATIONS

3GPP TSG RAN WG1 Ad-Hoc Meeting 1901, Taipei, Taiwan, Jan. 21-25, 2019, R1-1901146, Agenda item: 7.2.4.1.2, Source: ITL, Title: Discussion on NR V2X HARQ Mechanism. (Year: 2019).*

(Continued)

*Primary Examiner* — Peter G Solinsky
*Assistant Examiner* — Sanjay K Dewan
(74) *Attorney, Agent, or Firm* — Invenstone Patent, LLC

(57) ABSTRACT

Provided are methods and apparatuses for transmitting sidelink hybrid automatic repeat request (HARQ) feedback information. The method of a receiver user equipment (UE) includes: receiving configuration information on a physical sidelink feedback channel (PSFCH) resource set, receiving a physical sidelink shared channel (PSSCH) from a transmitter UE, determining a PSFCH resource used for transmitting the HARQ feedback information in response to the PSSCH in the PSFCH resource set based on pre-configured identification information, and transmitting the HARQ feedback information using the PSFCH resource.

12 Claims, 19 Drawing Sheets

(56) References Cited

U.S. PATENT DOCUMENTS

| | | | |
|---|---|---|---|
| 2020/0178039 A1* | 6/2020 | Lee | H04W 4/46 |
| 2020/0196255 A1* | 6/2020 | Cheng | H04L 5/0033 |
| 2020/0205166 A1* | 6/2020 | Huang | H04W 72/00 |
| 2020/0205171 A1* | 6/2020 | Jiang | H04W 24/08 |
| 2020/0235868 A1* | 7/2020 | Yu | H04L 5/0055 |
| 2020/0267597 A1* | 8/2020 | Huang | H04W 76/14 |
| 2020/0288286 A1* | 9/2020 | Hwang | H04L 1/1614 |
| 2020/0351024 A1* | 11/2020 | Baghel | H04L 1/1854 |
| 2020/0351032 A1* | 11/2020 | Wu | H04W 72/10 |
| 2020/0351033 A1* | 11/2020 | Ryu | H04L 1/1861 |

FOREIGN PATENT DOCUMENTS

| | | | | |
|---|---|---|---|---|
| SE | WO 2018/151637 A1 * | 8/2018 | | H04L 1/16 |
| WO | WO 2017/140475 A1 * | 8/2017 | | H04L 1/18 |

OTHER PUBLICATIONS

3GPP TSG RAN WG1 Meeting #94 bis, Chengdu, China, Oct. 8-12, 2018, Agenda item: 7.2.4.1.1, Source: Huawei, HiSilicon, Title: Support for sidelink unicast, groupcast and broadcast. (Year: 2018).*

3GPP TSG RAN WG1 #96 bis, Xi'an, China, Apr. 8-12, 2019, R1-1905892, Agenda item: 7.2.4.5, Source: LG Electronics, Title: Feature lead summary #2 for agenda item 7.2.4.5 Physical layer procedures for sidelink. (Year: 2019).*

3GPP TSG RAN WG1 #98 bis, Chongqing, China, Oct. 14-20, 2019, R1-1910299, Title: Discussion on PHY procedure for sidelink, Source: ZTE, Sanechips, Agenda item: 7.2.4.5. (Year: 2019).*

* cited by examiner

METHOD AND APPARATUS FOR TRANSMITTING SIDELINK HARQ FEEDBACK INFORMATION

This application claims the priority benefit of Korean Patent Application No. 10-2019-0001402, filed on Jan. 4, 2019 and No. 10-2019-0161978, filed on Dec. 6, 2019 in the Korean Intellectual Property Office, the disclosures of which are incorporated herein by reference in their entirety.

BACKGROUND

1. Technical Field

The present disclosure relates to methods and apparatuses for transmitting sidelink HARQ feedback information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

As an aspect of developing such items, there is a need for a design for transmitting HARQ ACK/NACK feedback information for data transmission and data reception over a sidelink that is a radio link between user devices (hereinafter, referred to as "user equipment" or "UE") for providing a V2X service in the NR, i.e. a NR sidelink.

SUMMARY

It is at least one object of the present disclosure to provide specific methods and apparatuses for allocating a radio resource for transmitting sidelink HARQ feedback information in the NR.

In accordance with one aspect of the present disclosure, a method of a receiver user equipment (UE) may be provided for transmitting hybrid automatic repeat request (HARQ) feedback information. The method may include: receiving configuration information on a PSFCH resource set, receiving a physical sidelink shared channel (PSSCH) from a transmitter UE, determining a physical sidelink feedback channel (PSFCH) resource used for transmitting the HARQ feedback information in response to the PSSCH in the PSFCH resource set based on pre-configured identification information, and transmitting the HARQ feedback information using the PSFCH resource.

In accordance with another aspect of the present disclosure, a method of a transmitter user equipment (UE) is provided for receiving hybrid automatic repeat request (HARQ) feedback information. The method may include: transmitting a PSSCH to a receiver UE, and receiving the HARQ feedback information in response to the PSSCH using a PSFCH resource determined based on pre-configured identification information in a PSFCH resource set.

In accordance with further another aspect of the present disclosure, a receiver user equipment (UE) is provided for transmitting hybrid automatic repeat request (HARQ) feedback information. The receiver UE may include a receiver configured to receive configuration information on a PSFCH resource set and receive a PSSCH from a transmitter UE, a controller configured to determine a PSFCH resource used for transmitting the HARQ feedback information in response to the PSSCH in the PSFCH resource set based on pre-configured identification information, and a transmitter configured to transmit the HARQ feedback information using the PSFCH resource.

In accordance with yet another aspect of the present disclosure, a transmitter user equipment (UE) is provided for receiving hybrid automatic repeat request (HARQ) feedback information. The transmitter UE may include: a transmitter transmitting a PSSCH to a receiver UE, and a receiver receiving the HARQ feedback information in response to the PSSCH using a PSFCH resource determined based on pre-configured identification information in a PSFCH resource set.

In accordance with embodiments of the present disclosure, it is possible to provide methods and apparatuses for transmitting sidelink HARQ feedback information for enabling a radio resource for transmitting the sidelink HARQ feedback information to be allocated in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
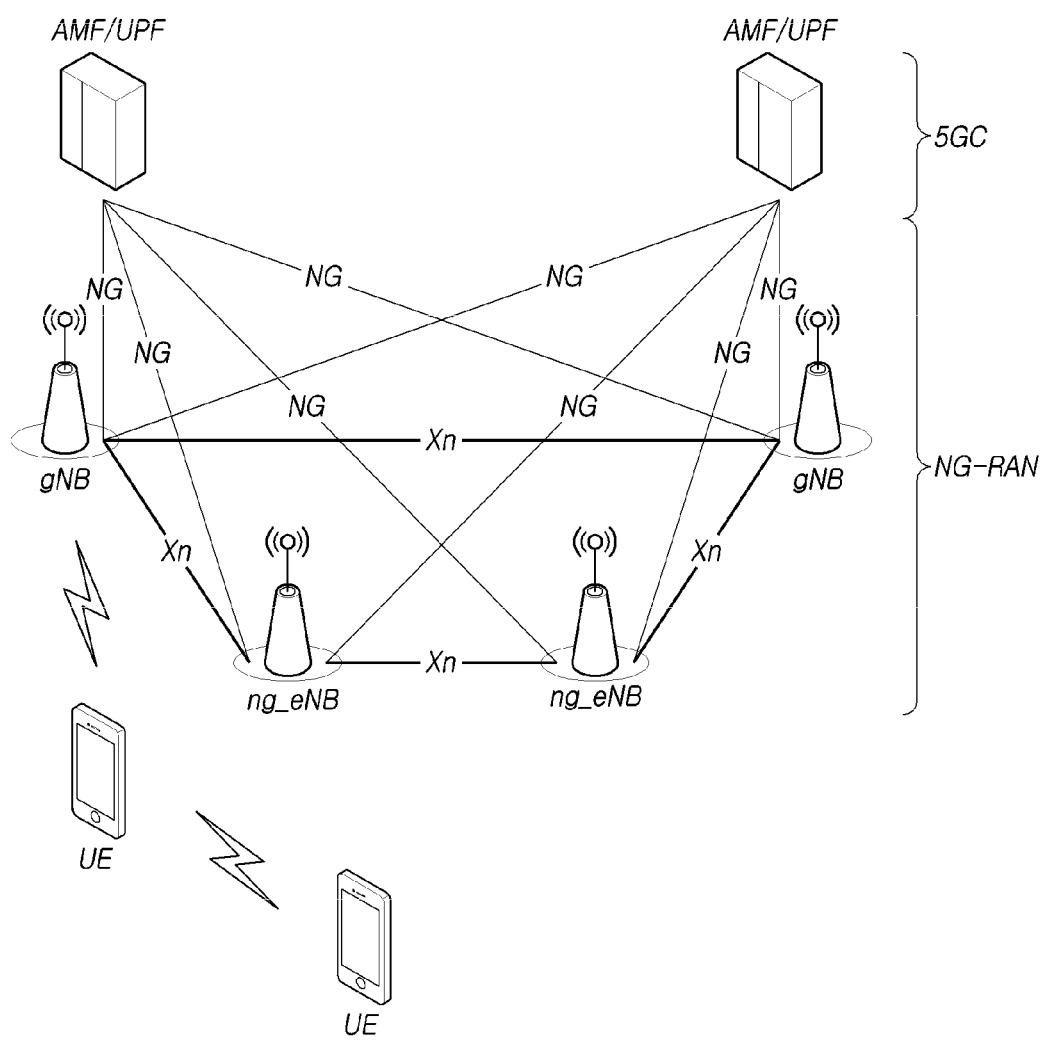
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, V is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
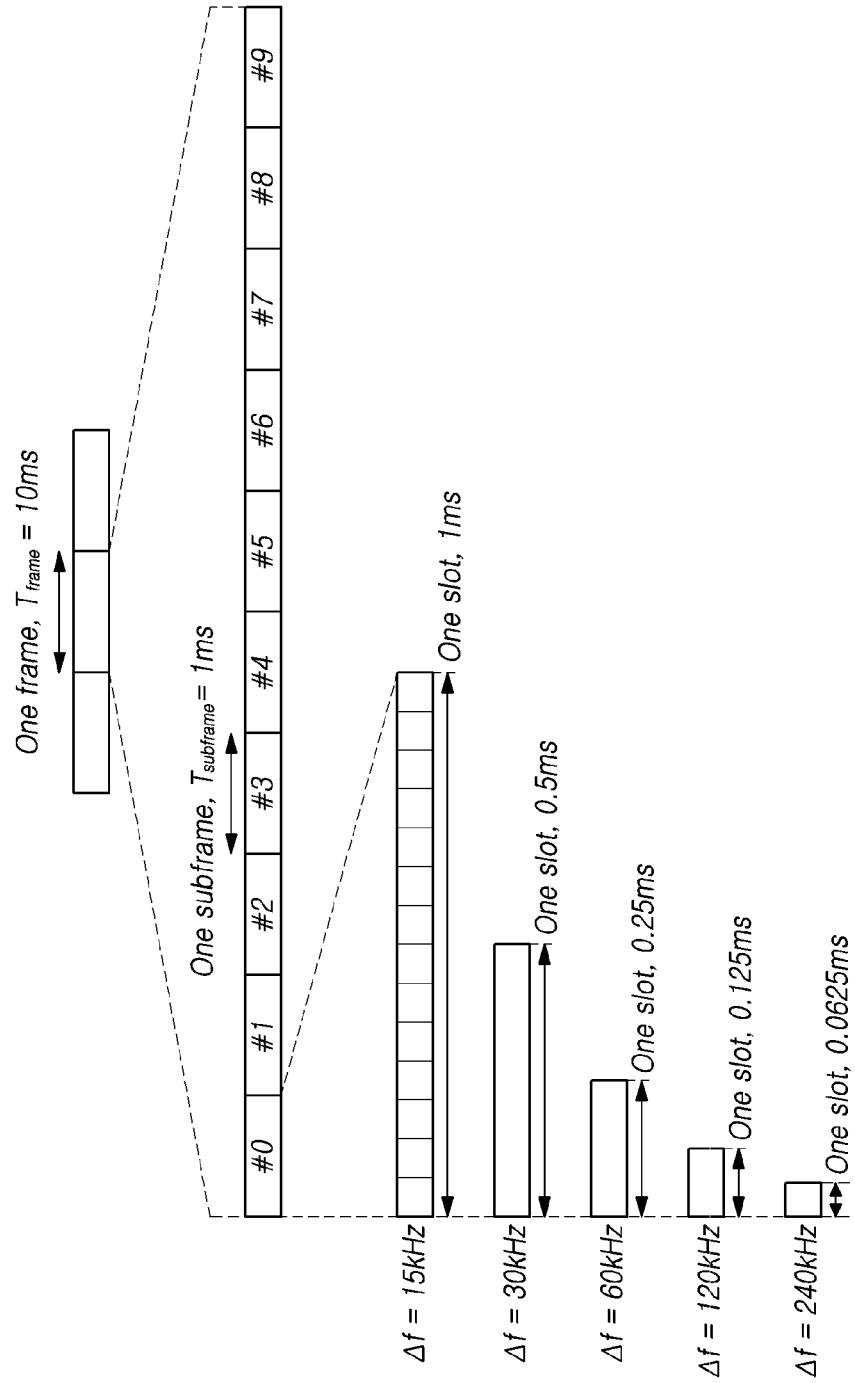
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
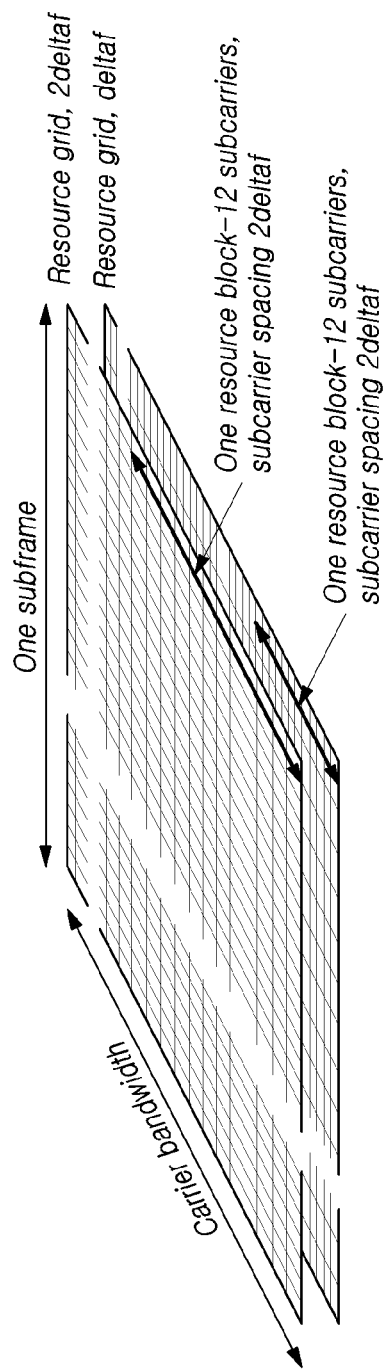
FIG. 3 is a view for explaining resource grids supported by a radio access technology in accordance with embodiments of the present disclosure.

FIG. 3 is a view for explaining resource grids supported by a radio access technology to which the present embodiment is applicable.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
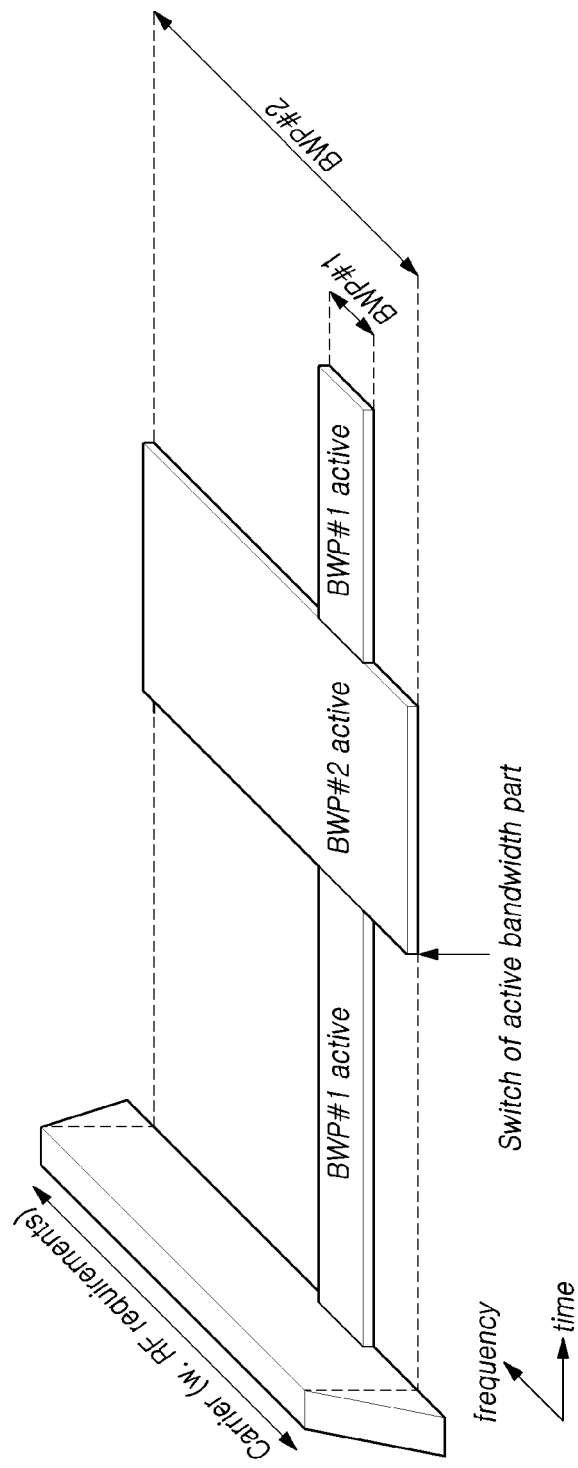
FIG. 4 is a view for explaining bandwidth parts supported by a radio access technology in accordance with embodiments of the present disclosure.

FIG. 4 is a view for explaining bandwidth parts supported by a radio access technology to which the present embodiment is applicable.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
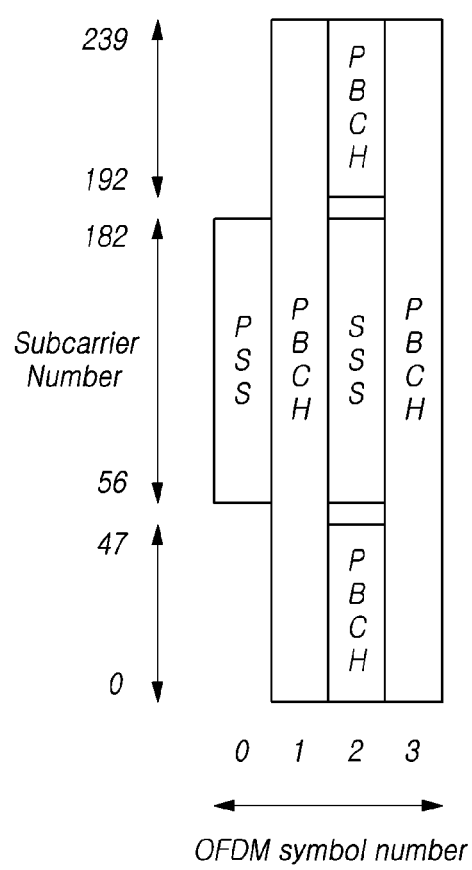
FIG. 5 is a view illustrating an example of a synchronization signal block in a radio access technology in accordance with embodiments of the present disclosure.

FIG. 5 is a view illustrating an example of a synchronization signal block in a radio access technology to which the present embodiment is applicable.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
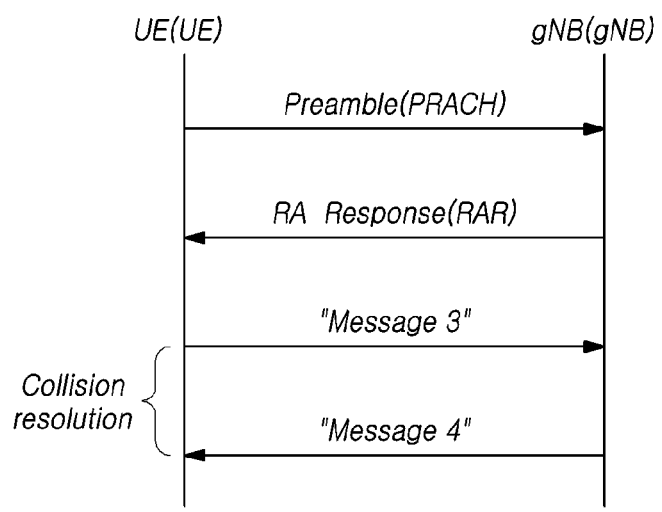
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
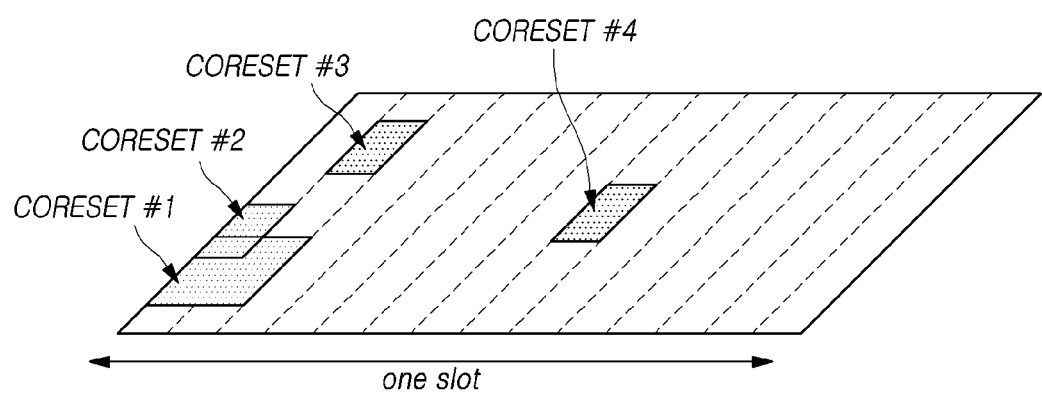
FIG. 7 is a view for explaining CORESET.

FIG. 7 is a view for explaining CORESETs.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<Lte Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to allocate a radio resource for the sidelink, two modes have been developed, i.e. i) mode 1 in which a base station allocates a radio resource and ii) mode 2 in which a UE selects and allocates a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14, and determined key performance requirements according to road conditions. In addition, the 3GPP have derived 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource allocation technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Allocation>

Figure 8:
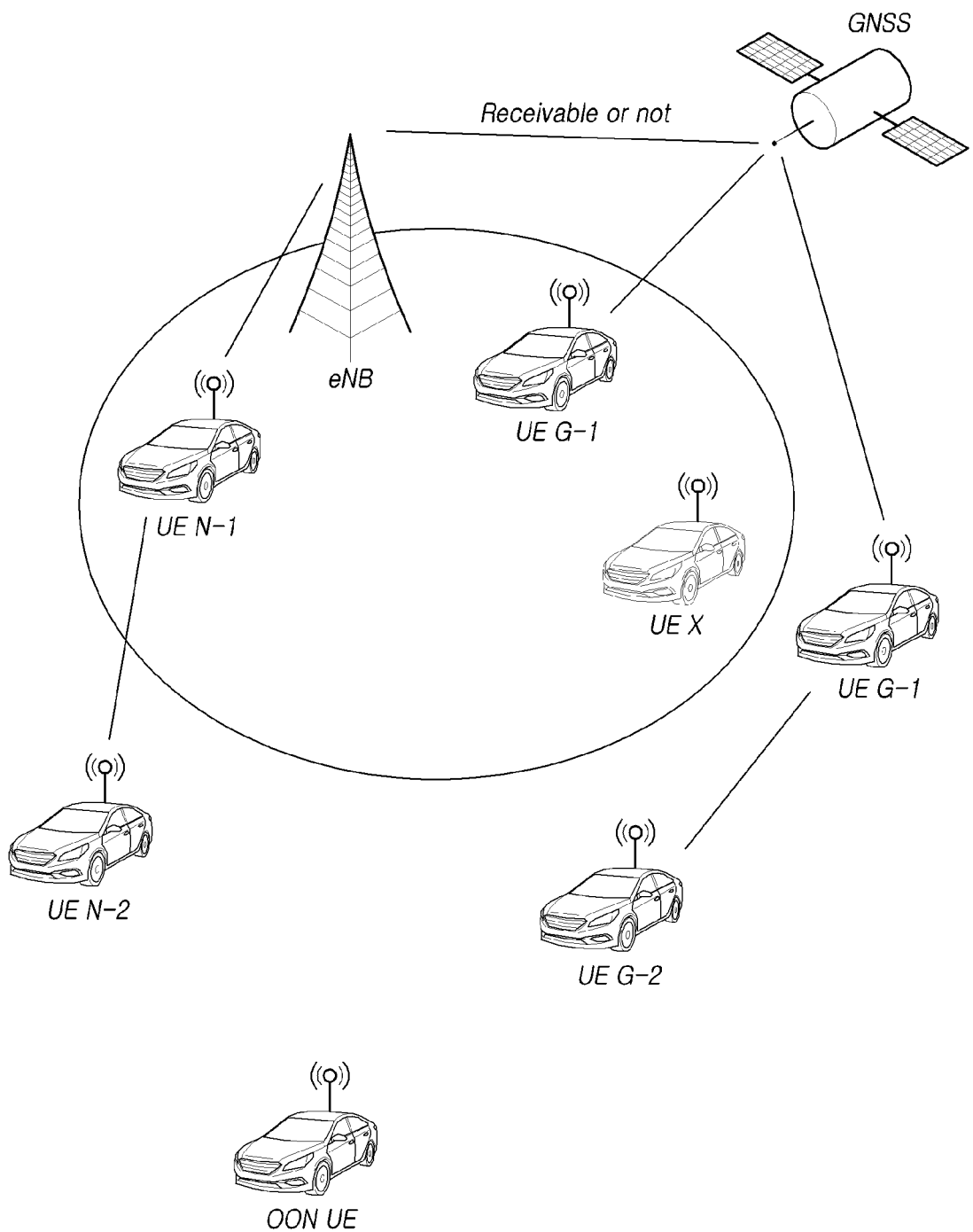
FIG. 8 is a view for explaining various scenarios for V2X communication.

FIG. 8 is a view for explaining various scenarios for V2X communication.

Referring to FIG. 8, a V2X device (represented to a vehicle; however, may be replaced with other devices, such as a user equipment (UE), etc.) may be located in coverage of a base station (an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to allocate a radio resource for enabling a corresponding UE to perform communication using the sidelink. The allocation of the radio resource includes a method of a base station for handling the allocation of the radio resource and a method of a UE on its own selects and allocates the radio resource.

Specifically, in the D2D, for enabling a UE to allocate a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area allocated to this to a transmitter UE.

Figure 9A:
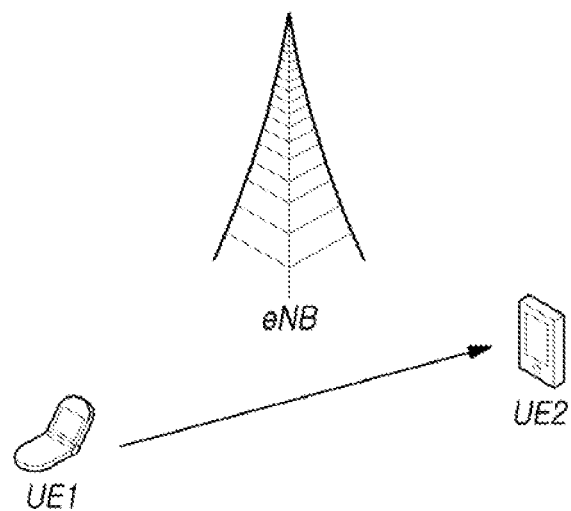
FIG. 9A is a view illustrating a first UE (UE1) and a second UE (UE2) performing sidelink communication.
Figure 9B:
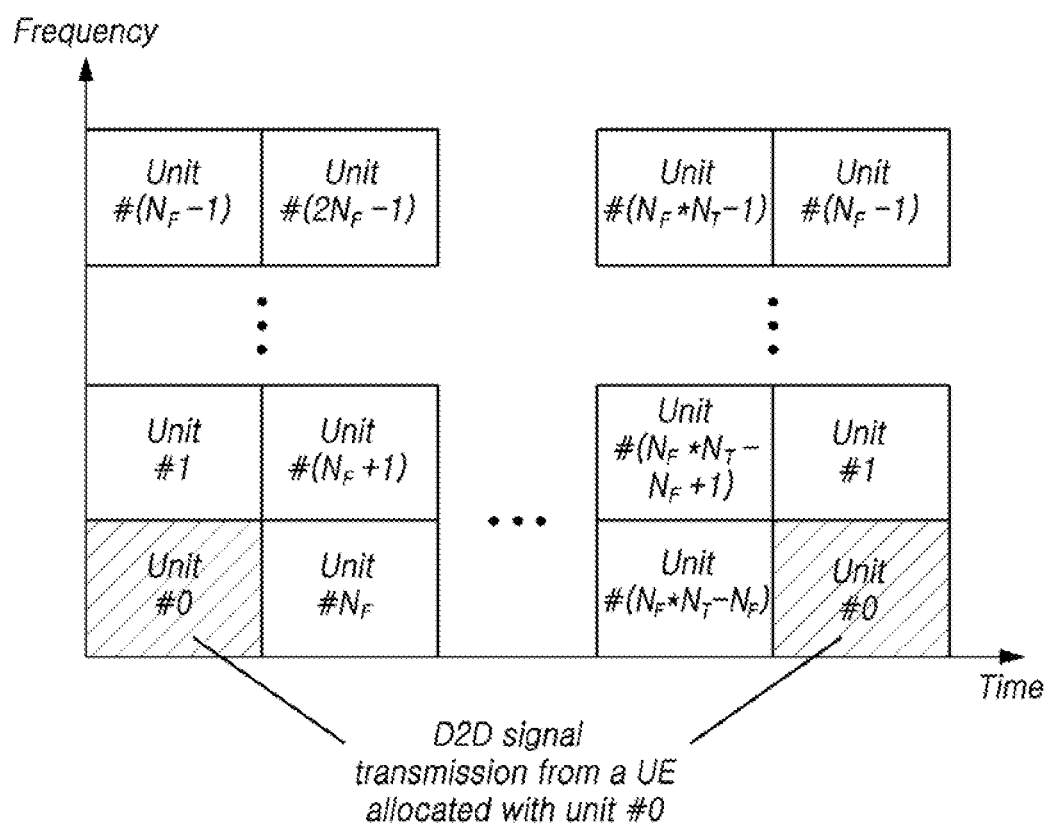
FIG. 9B is a view illustrating an example of resource pools for UEs.

FIG. 9A illustrates a first UE (UE 1) and a second UE (UE 2) performing sidelink communication, and FIG. 9B illustrates an example of resource pools used by the UEs.

Referring to FIG. 9, a base station is represented as an eNB; however, may be a gNB or an ng-eNB as described above. Further, the UEs are represented as mobile terminals; however, vehicles, infrastructures, or the like may be applied variously depending on scenarios or situations.

In FIG. 9A, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units can be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may lead a time delay until a data resource is allocated after a SA resource has been allocated to be reduced. For example, it is possible to consider a non-adjacent scheme in which a control channel resource and a data channel resource are split in time domain in one subframe, an adjacent scheme in which a control channel and a data channel are consecutively allocated in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of allocating a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for communication using the sidelink to be performed. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
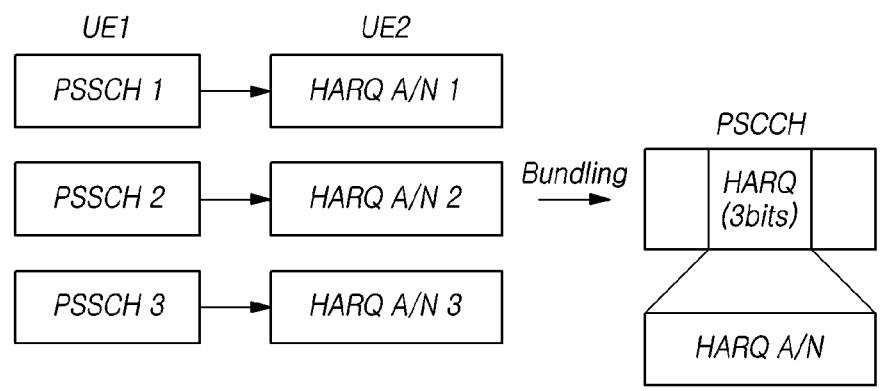
FIG. 10 is a view for explaining a method of bundling and transmitting HARQ feedback information in the V2X.

FIG. 10 is a view for explaining a method of bundling and transmitting HARQ feedback information in the V2X;

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Allocation

At least two sidelink resource allocation modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource allocation sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
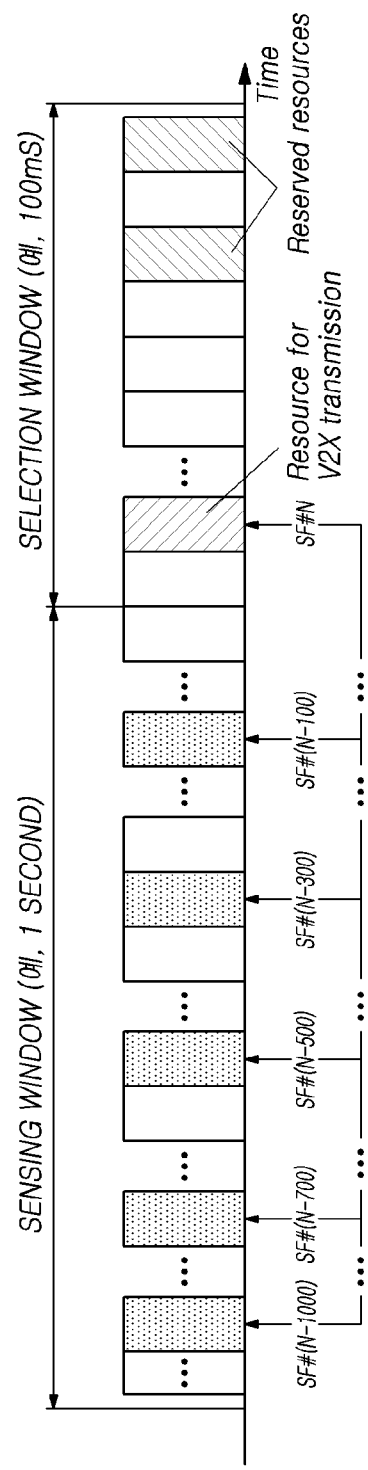
FIGS. 11A and 11B are illustrates a type of a V2X transmission resource pool.
Figure 11B:
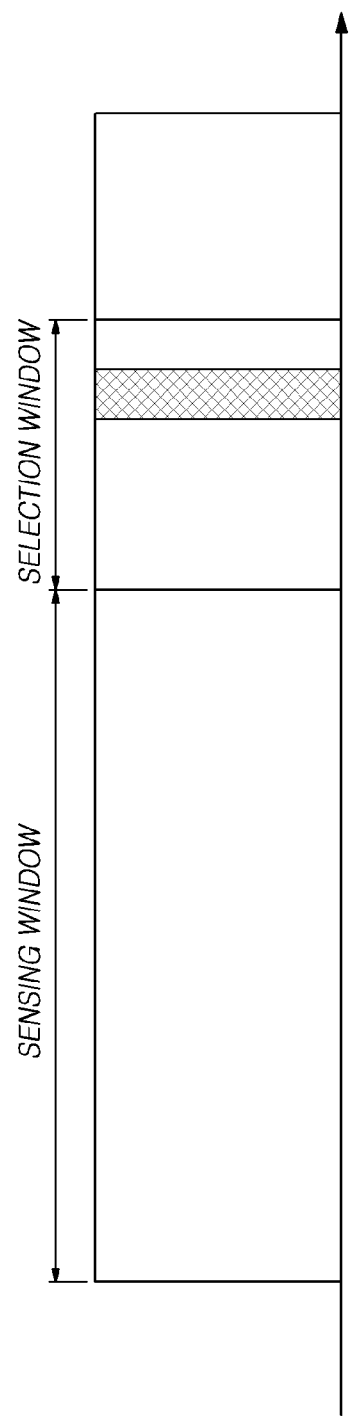

FIGS. 11A and 11B are illustrates a type of a V2X transmission resource pool.

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool over that allows a random selection only. In V2X transmit resource pool #B, a UE does not perform partial sensing, and may randomly select a V2X transmission resource in a selection window.

As one example, unlike a resource pool over which partial sensing only is allowed, in a resource pool over which the random selection only is allowed, a selected resource may be configured/signaled not to be semi-statically reserved. In order for a UE to perform a V2X message transmission operation over a V2X transmission resource pool, a base station may cause the UE not to perform a sensing operation (based on scheduling allocation decoding/energy measurement).

Although not illustrated in FIGS. 11A and 11B, a resource pool over allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined, and thus the scheduling for the latency critical data, such as the URLLC, may be performed based on the mini-slot.

Figure 12:
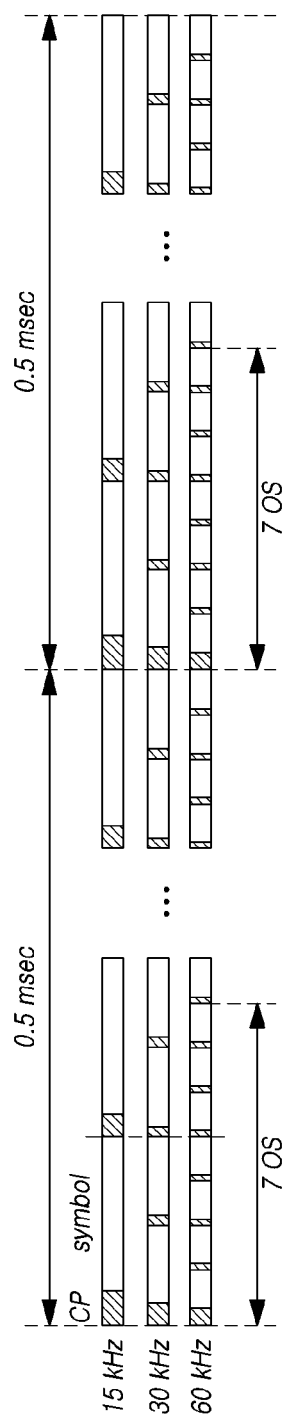
FIG. 12 is a view illustrating an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
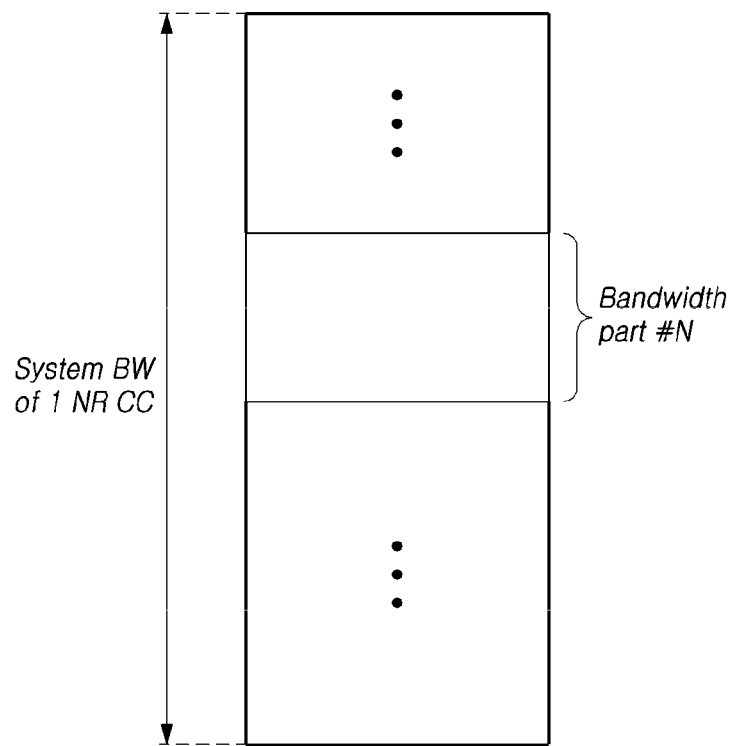
FIG. 13 is a view schematically illustrating a bandwidth part to which embodiments of the present disclosure may be applied.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

LTE Sidelink

In the LTE system, for providing device-to-device direct communication and a vehicle-to-everything (V2X) (in particular, vehicle-to-vehicle (V2V)) service, designs for a radio channel and a radio protocol for transmission/reception of the sidelink which is direct link between UEs have been developed. With respect to the sidelink, the PSSS/SSSS and a physical sidelink broadcasting channel (PSBCH) are defined. The PSSS/SSS is a signal for synchronizing between a radio sidelink transmission end and a radio sidelink reception end, and the physical sidelink broadcasting channel (PSBCH) is a broadcasting channel for transmitting/receiving a sidelink master information block (MIB) related to this. Further, many studies have been conducted to develop a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

A Method of Allocating a HARQ ACK/NACK Feedback Resource

According to a PUCCH resource allocation method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

Hereinafter, a method of transmitting sidelink HARQ feedback information is specifically described with reference to drawings.

Herein, the term "receiver UE" means a UE receiving a PSCCH and a PSSCH corresponding to the PSCCH based on sidelink communication. The term "transmitter UE" herein means a UE transmitting a PSCCH and a PSSCH corresponding to the PSCCH based on sidelink communication.

Embodiments herein will be basically described based on a scenario in which a receiver UE transmits HARQ ACK/NACK feedback information based on the sidelink to a transmitter UE. However, embodiments of the present disclosure may be substantially equally applied to a scenario in which a receiver UE transmits HARQ ACK/NACK feedback information to a base station without departing from the spirit and the scope of the present disclosure.

Figure 14:
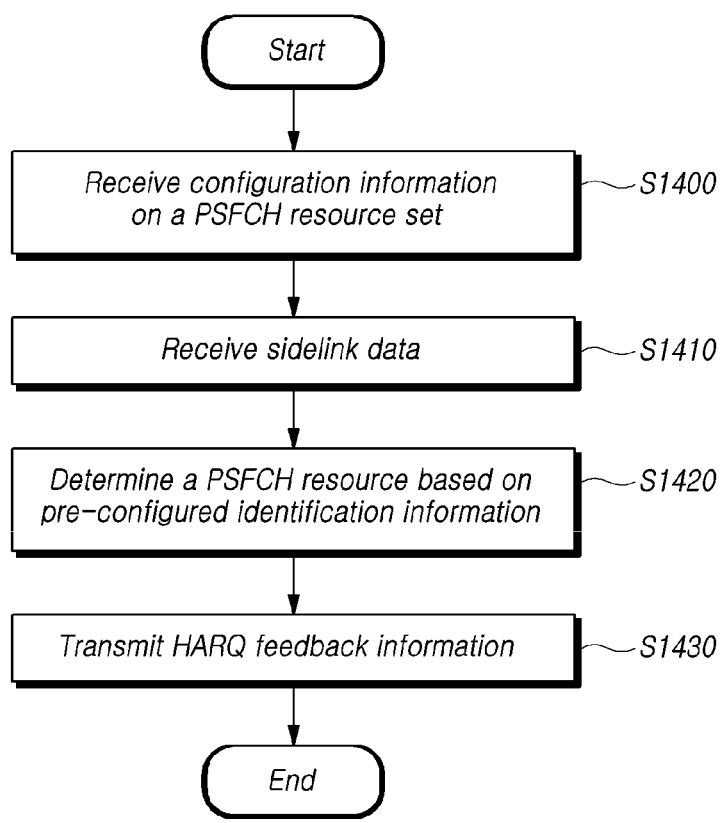
FIG. 14 is a flow diagram illustrating a procedure through which a receiver UE transmits sidelink HARQ feedback information in accordance with embodiments of the present disclosure.

FIG. 14 is a flow diagram illustrating a procedure of a receiver UE for transmitting sidelink HARQ feedback information in accordance with embodiments of the present disclosure.

Referring to FIG. 14, a receiver UE may receive configuration information on a sidelink feedback channel (e.g., a physical sidelink feedback channel (PSFCH)) resource set, at step S1400.

When a PSSCH is received based on sidelink communication, the receiver UE may transmit HARQ ACK/NACK feedback information corresponding to the received PSSCH. That is. a PSFCH resource set or a PSFCH resource pool may be configured for transmitting the HARQ ACK/NACK feedback information in response to the PSSCH reception. Configuration information on the PSFCH resource set or the PSFCH resource pool may be configured with time-domain resource allocation information and frequency resource assignment information. In this present disclosure, both the resource set and the resource pool are employed and described; however, without departing from the spirit and the scope of the present disclosure, hereinafter, these two terms may be applicable as a substantially equal meaning or function to each other.

The configuration information on the PSFCH resource set or the PSFCH resource pool may be configured through cell-specific or UE-specific higher layer signaling by a base station, or pre-configured. Alternatively, the configuration information on the PSFCH resource set or the PSFCH resource pool may be configured by a transmitter UE or a scheduler UE, and then transmitted to a receiver UE over a sidelink radio channel, such as a PSDCH, a PSCCH, a PSSCH, or the like.

In one embodiment, a PSFCH format of a PSFCH resource may be configured based on a PUCCH format. That is, a PSFCH structure may be configured to reuse a PUCCH structure, such as PUCCH format 1, 2, 3, 4, or 5, or a PSCCH structure, defined in the NR.

In one embodiment, the PSFCH resource pool may be configured independently of a PSCCH or PSSCH resource pool configuration. In this case, RRC parameters for the PSFCH resource pool may be configured separately from RRC parameters for the PSCCH or PSSCH resource pool configuration, and then, explicitly configured through higher layer signaling. It should be noted that this is merely one example; therefore, embodiments of the present disclosure are not limited to thereto. The RRC parameters for the PSFCH resource pool may be pre-configured.

In another embodiment, the PSFCH resource pool may be configured to be associated with a PSCCH or PSSCH resource pool configuration. In this case, any PSCCH or PSSCH resource pool configuration information may include configuration information on the associated PSFCH resource pool. That is, any PSCCH or PSSCH resource pool configuration information may include slot allocation information for indicating time-domain resource allocation information of the corresponding resource pool. Specifically, the PSCCH or PSSCH resource pool configuration information may include period configuration information, slot offset information, or the like for allocating one or more sidelink slot(s) over which the PSCCH or PSSCH resource pool is configured.

In this case, timing gap related information between i) a sidelink slot over which each PSSCH or PSCCH resource pool is configured and ii) a sidelink slot over which a PSFCH resource pool corresponding to the slot for configuring the PSSCH or PSCCH resource pool is configured may be included as configuration information on the PSFCH resource pool. In one embodiment, when i) a sidelink slot over which a PSSCH resource pool is configured and ii) a sidelink slot over which a PSFCH resource pool associated with the PSSCH resource pool is configured are in one-to-one correspondence, corresponding timing gap configuration information may be direct slot gap information between the PSSCH and the PSFCH. That is, when a corresponding timing gap configuration value is K and when a UE receives a PSSCH in slot #n, the UE may transmit HARQ ACK/NACK feedback using a PSFCH resource pool of slot #(n+K) after the K slot(s) which correspond(s) to the timing gap configuration value.

In another embodiment, when i) a sidelink slot over which a PSSCH resource pool is configured and ii) a sidelink slot over which an associated PSFCH resource pool is configured are in N-to-one correspondence (e.g., N is an integer more than 1), timing gap configuration information between the corresponding PSSCH resource pool and the associated PSFCH resource pool may be required minimum slot gap information. That is, when a corresponding timing gap configuration value is M, for HARQ ACK/NACK feedback in response to receiving a PSSCH from any UE, a receiver UE may transmit HARQ ACK/NACK feedback information using a first PSFCH resource pool after (a) minimum M slot(s) from a corresponding slot. That is, when a PSFCH resource pool is configured at a period of N sidelink slots for sidelink slots over which a PSCCH or PSSCH resource pool is configured, the M value along with the corresponding N value may be configured through higher layer signaling, or pre-configured, or a M value may be defined as a function of the corresponding N value.

In this case, when the UE receives the PSSCH in slot #n, the UE may transmit HARQ ACK/NACK feedback using a PSFCH resource pool of slot #(n+M). Alternatively, the UE may transmit the HARQ ACK/NACK feedback using a first PSFCH resource pool after slot #(n+M−1).

A PSFCH resource for allowing a receiver UE to perform HARQ ACK/NACK feedback in response to PSSCH reception may be allocated using the configured PSFCH resource pool. At this time, PSFCH resource allocation information in the PSFCH resource pool may be explicitly signaled or implicitly signaled.

In one embodiment, a PSFCH resource set may be configured for allowing a receiver UE to perform HARQ ACK/NACK feedback in response to PSSCH reception. The PSFCH resource set may be configured by a base station and then transmitted through cell-specific or UE-specific higher layer signaling, or be configured by a transmitter UE or a scheduler UE and transmitted over a sidelink radio channel, such as a PSDCH, a PSCCH, a PSSCH, or the like.

A PSFCH resource for allowing any UE to perform HARQ ACK/NACK feedback in response to PSSCH reception may be allocated using the configured PSFCH resource set. At this time, PSFCH resource allocation information in the PSFCH resource set may be explicitly signaled or implicitly signaled.

Referring back to FIG. 14, when a sidelink data channel (e.g., physical sidelink shared channel (PSSCH)) is received from a transmitter UE, at step S1410, the receiver UE may determine a PSFCH resource used for transmitting HARQ feedback information in response to the PSSCH in the PSFCH resource set based on certain identification information, at step S1420.

In one embodiment, the PSFCH resource, which is to be used for allowing the receiver UE to perform HARQ ACK/NACK feedback in response to PSSCH reception, among PSFCHs included in a PSFCH resource pool or a PSFCH resource set may be implicitly signaled. In this case, the PSFCH resource may be allocated as a function of a sub-channel index for a sub-channel over which PSCCH or PSSCH transmission has been performed.

In one embodiment, when the PSSCH transmission is performed based on the groupcast, if a plurality of receiver UEs shares one or more PSFCH(s) that is (are) provided by one implicit signaling, there is a possibility of a collision of PSFCH transmission resources for HARQ ACK/NACK feedback between the plurality of receiver UEs. In order to prevent such a collision, UE-specific offset may be applied in relation to allocating PSFCH resources for allowing sidelink UEs to perform HARQ ACK/NACK feedback. The receiver UE may derive a final PSFCH resource for HARQ ACK/NACK feedback by applying a UE specific offset value (e.g., set for each UE) to PSFCH resource information implicitly signaled by a base station, a sidelink transmitter UE, or a sidelink scheduler UE.

In one embodiment, the UE specific PSFCH offset value may be set by a base station for each UE through UE specific higher layer signaling, MAC CE signaling, L1 control signaling, or the like. In another embodiment, when a groupcast session is established, the UE specific PSFCH offset values may be set by a base station, a sidelink transmitter UE, or a sidelink scheduler UE, and then, transmitted to respective UEs. In further another embodiment, when groupcast-based PSSCH resources are allocated, the UE specific PSFCH offset values may be transmitted to respective UEs over a PDCCH or a PSCCH.

In yet another embodiment, the UE specific PSFCH offset value may implicitly set as a function of each UE ID, or the like. For example, the UE specific PSFCH offset value may be derived as a function of a C-RNTI of a corresponding UE. In yet another embodiment, a UE ID for sidelink transmission/reception is defined, and as a result, a corresponding UE specific PSFCH offset value may be derived. In this case, the UE ID for corresponding sidelink transmission/reception may be a UE ID of a higher layer that is a group ID (a member ID) for a group including a receiver UE in groupcast data transmission, or may be in the form of a destination ID as a target of corresponding unicast or groupcast data transmission or a source ID as a identifier of a transmitter UE. Alternatively, the UE ID for corresponding sidelink transmission/reception may be a sidelink physical layer ID, or the like for PSCCH reception, such as a SL-RNTI.

The UE ID for sidelink transmission/reception may set by a base station and then allocated through UE specific higher layer signaling. Or, the UE ID ay be set by a sidelink transmitter UE or a sidelink scheduler UE and then transmitted over a sidelink radio channel, such as a PSDCH, a PSCCH, a PSSSCH, or the like. UE specific PSFCH offset information for each sidelink UE may be transmitted to a groupcast PSSCH transmitter UE. Specifically, the UE specific PSFCH offset information for each receiver UE may be transmitted by a base station to a groupcast PSSCH transmitter UE through higher layer signaling or MAC CE signaling, or transmitted by a scheduler UE to a corresponding groupcast PSSCH transmitter UE over a sidelink radio channel.

In one embodiment, whether the UE specific PSFCH offset is applied may be additionally indicated in relation to allocating a PSFCH resource for HARQ ACK/NACK feedback in response to PSSCH reception. That is, in relation to allowing a receiver UE to derive a PSFCH resource for the HARQ ACK/NACK feedback in response to the corresponding PSSCH reception, it can be configured that a base station, a sidelink transmitter UE, or a sidelink scheduler UE indicates whether to apply a configured UE specific PSFCH offset value.

Whether the corresponding UE specific PSFCH offset is applied may be indicated over a PDCCH or a PSCCH by being included in DCI or SCI for transmitting any PSSCH resource allocation information. In this case, in one embodiment, an information area for indicating whether the corresponding UE specific PSFCH offset is applied may be included in a DCI format or a SCI format including resource allocation information for the PSSCH.

In another embodiment, when transmitting a DCI format or a SCI format including PSSCH allocation information, whether the UE specific PSFCH offset is applied may be implicitly indicated as a function of an RNTI scrambled in CRC, a search space/CORESET over which a DCI format or a SCI format is transmitted, a PSCCH resource pool, or the like.

In another embodiment, whether the UE specific PSFCH offset is applied may be semi-statically configured for a receiver UE through higher layer signaling. In another embodiment, whether the UE specific PSFCH offset is applied may be activated or deactivated through MAC CE signaling.

Referring back to FIG. 14, the receiver UE may transmit the HARQ feedback information using the PSFCH resource, at step S1420.

The receiver UE may transmit HARQ ACK/NACK feedback information for the received PSSCH using the determined PSFCH resource. In this case, the receiver UE may transmit the HARQ ACK/NACK feedback information to a base station or a transmitter UE that has transmitted the PSSCH.

According to the above description, it is possible to provide methods and apparatuses for transmitting sidelink HARQ feedback information for enabling a radio resource for transmitting the sidelink HARQ feedback information to be allocated in the NR in accordance with embodiments of the present disclosure.

Figure 15:
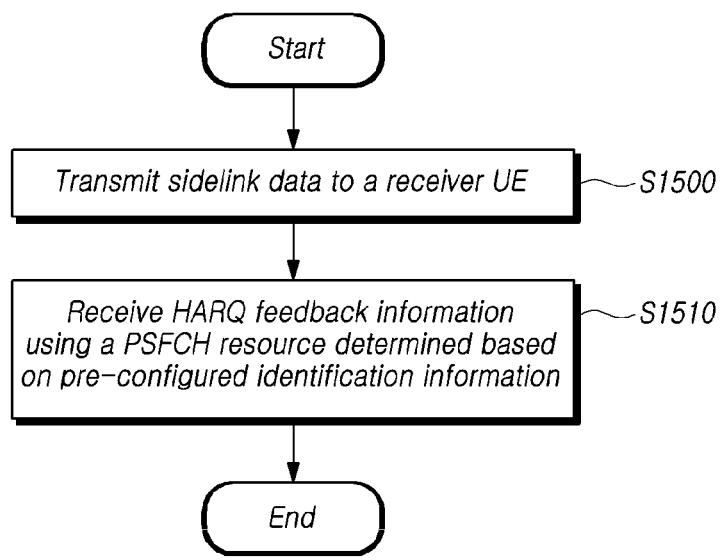
FIG. 15 is a flow diagram illustrating a procedure through which a transmitter UE receives sidelink HARQ feedback information in accordance with embodiments of the present disclosure.

FIG. 15 is a flow diagram illustrating a procedure of a transmitter UE for receiving sidelink HARQ feedback information in accordance with embodiments of the present disclosure.

Referring to FIG. 15, the transmitter UE may transmit a physical sidelink shared channel (PSSCH) to a receiver UE, at step S1500.

When the PSSCH is transmitted based on sidelink communication, the transmitter UE may receive HARQ ACK/NACK feedback information corresponding to the transmitted PSSCH from a receiver UE. That is. a PSFCH resource set or a PSFCH resource pool may be configured for transmitting the HARQ ACK/NACK feedback information in response to the PSSCH reception. Configuration information on the PSFCH resource set or the PSFCH resource pool may be configured with time-domain resource allocation information and frequency resource assignment information.

The configuration information on the PSFCH resource set or the PSFCH resource pool may be configured through cell-specific or UE-specific higher layer signaling by a base station, or pre-configured. Alternatively, the configuration information on the PSFCH resource set or the PSFCH resource pool may be configured by a transmitter UE or a scheduler UE, and then transmitted to a receiver UE over a sidelink radio channel, such as a PSDCH, a PSCCH, a PSSCH, or the like.

In one embodiment, when the configuration information on the PSFCH resource set or the PSFCH resource pool is configured by the transmitter UE and then transmitted, the procedure of FIG. 15 may further include an operation of the transmitter UE for transmitting configuration information on a sidelink feedback channel (physical sidelink feedback channel (PSFCH)) resource set.

In one embodiment, the PSFCH resource pool may be configured independently from a PSCCH or PSSCH resource pool configuration. In this case, RRC parameters for the PSFCH resource pool may be configured separately from RRC parameters for the PSCCH/PSSCH resource pool and explicitly configured through higher layer signaling. It should be noted that this is merely one example; therefore, embodiments of the present disclosure are not limited to thereto. RRC parameters for the PSFCH resource pool may be pre-configured.

In another embodiment, the PSFCH resource pool may be configured to be associated with a PSCCH or PSSCH resource pool configuration. In this case, PSCCH or PSSCH resource pool configuration information may include configuration information on an associated PSFCH resource pool. That is, any PSCCH or PSSCH resource pool configuration information may include slot allocation information for indicating time-domain resource allocation information of the corresponding resource pool. Specifically, the PSCCH or PSSCH resource pool configuration information may include period configuration information, slot offset information, or the like for allocating one or more sidelink slot(s) over which the PSCCH or PSSCH resource pool is configured.

In this case, timing gap related information between i) a sidelink slot over which each PSSCH or PSCCH resource pool is configured and ii) a sidelink slot over which a PSFCH resource pool corresponding to the slot for configuring the PSSCH or PSCCH resource pool is configured may be included as configuration information on the PSFCH resource pool. In one embodiment, when i) a sidelink slot over which a PSSCH resource pool is configured and ii) a sidelink slot over which a PSFCH resource pool associated with the PSSCH resource pool is configured are in one-to-one correspondence, corresponding timing gap configuration information may be direct slot gap information between the PSSCH and the PSFCH. That is, when a corresponding timing gap configuration value is K, and a UE receives a PSSCH in slot #n, the UE may transmit HARQ ACK/NACK feedback using a PSFCH resource pool of slot #(n+K) after the K slot(s) which correspond(s) to the timing gap configuration value.

Alternatively, when i) a sidelink slot over which a PSSCH resource pool is configured and ii) a sidelink slot over which an associated PSFCH resource pool is configured are in N-to-one correspondence (N is an integer more than 1), timing gap configuration information between the corresponding PSSCH resource pool and the associated PSFCH resource pool may be required minimum slot gap information. That is, when a corresponding timing gap configuration value is M, for HARQ ACK/NACK feedback in response to receiving a PSSCH from any UE, a receiver UE can transmit HARQ ACK/NACK feedback information using a first PSFCH resource pool after (a) minimum M slot(s) from a corresponding slot. That is, when a PSFCH resource pool is configured at a period of N sidelink slots for sidelink slots over which a PSCCH or PSSCH resource pool is configured, the M value along with the corresponding N value may be configured through higher layer signaling, or pre-configured, or any M value may be defined as a function of the corresponding N value.

In this case, when the UE receives the PSSCH in slot #n, the UE may transmit HARQ ACK/NACK feedback using a PSFCH resource pool of slot #(n+M). Alternatively, the UE may transmit the HARQ ACK/NACK feedback using a first PSFCH resource pool after slot #(n+M−1).

A PSFCH resource for allowing a receiver UE to perform HARQ ACK/NACK feedback in response to PSSCH reception may be allocated using a configured PSFCH resource pool. At this time, PSFCH resource allocation information in the PSFCH resource pool may be explicitly signaled or implicitly signaled.

In one embodiment, a PSFCH resource set may be configured for allowing a receiver UE to perform HARQ ACK/NACK feedback in response to PSSCH reception. The PSFCH resource set may be configured by a base station and then transmitted through cell-specific or UE-specific higher layer signaling. Or, the PSFCH resource set may be configured by a transmitter UE or a scheduler UE and transmitted over a sidelink radio channel, such as a PSDCH, a PSCCH, a PSSCH, or the like.

A PSFCH resource for allowing any UE to perform HARQ ACK/NACK feedback in response to PSSCH reception may be allocated using the configured PSFCH resource set. At this time, PSFCH resource allocation information in the PSFCH resource set may be explicitly signaled or implicitly signaled.

Referring back to FIG. 15, the transmitter UE may receive HARQ feedback information for the PSSCH using a PSFCH resource determined in the receiver UE based on certain identification information in a PSFCH resource set, at step S1510.

In one embodiment, the PSFCH resource is to be used for allowing the receiver UE to perform HARQ ACK/NACK feedback in response to PSSCH reception, among PSFCHs included in a PSFCH resource pool. Such a PSFCH resource or a PSFCH resource set may be implicitly signaled. In this case, the receiver UE may determine the PSFCH resource as a function of a sub-channel index for a sub-channel over which PSCCH or PSSCH transmission has been performed.

In one embodiment, when the PSSCH transmission is performed based on the groupcast, if a plurality of receiver UEs shares one or more PSFCH(s) that is(are) provided by one implicit signaling, there is a possibility of a collision of PSFCH transmission resources for HARQ ACK/NACK feedback between the plurality of receiver UEs. In order to prevent such a collision, UE-specific offset may be applied in relation to allocating PSFCH resources for allowing sidelink UEs to perform HARQ ACK/NACK feedback. The receiver UE may derive a final PSFCH resource for HARQ ACK/NACK feedback by applying a UE specific offset value (e.g., set for each UE) to PSFCH resource information implicitly signaled by a base station, a sidelink transmitter UE, or a sidelink scheduler UE.

In one embodiment, a base station may be set the UE specific PSFCH offset value for each UE through UE specific higher layer signaling, MAC CE signaling, L1 control signaling, or the like. In another embodiment, when a groupcast session is established, a base station, a transmitter UE, or a scheduler UE may set UE specific PSFCH offset values and then transmit the set values to respective UEs. In further another embodiment, when groupcast based PSCCH resources are allocated, a base station, a transmitter UE, or a scheduler UE may transmit UE specific PSFCH offset values to respective UEs over a PDCCH or a PSCCH.

In yet another embodiment, the UE specific PSFCH offset value may implicitly set as a function of each UE ID, or the like. For example, the UE specific PSFCH offset value may be derived as a function of a C-RNTI of a corresponding UE. In yet another embodiment, a UE ID for sidelink transmission/reception is defined, and as a result, a corresponding UE specific PSFCH offset value may be derived. In this case, the UE ID for corresponding sidelink transmission/reception may be a UE ID of a higher layer that is a group ID (a member ID) for a group including a receiver UE in groupcast data transmission. Alternatively, the UE ID may be in the form of a destination ID as a target of corresponding unicast or groupcast data transmission or a source ID as an identifier of a transmitter UE. Alternatively, the UE ID for corresponding sidelink transmission/reception may be a sidelink physical layer ID, or the like for PSCCH reception, such as a SL-RNTI.

The UE ID for sidelink transmission/reception may set by a base station and then allocated through UE specific higher layer signaling. Or the UE ID may be set by a sidelink transmitter UE or a sidelink scheduler UE and then transmitted over a sidelink radio channel, such as a PSDCH, a PSCCH, a PSSSCH, or the like. A groupcast PSSCH transmitter UE may receive UE specific PSFCH offset information for each sidelink receiver UE. Specifically, the groupcast PSSCH transmitter UE may receive UE specific PSFCH offset information for each receiver UE from a base station through higher layer signaling, MAC CE signaling, or L1 control signaling, or receive from a scheduler UE over a sidelink radio channel.

In one embodiment, whether the UE specific PSFCH offset is applied may be additionally indicated in relation to allocating a PSFCH resource for HARQ ACK/NACK feedback in response to PSSCH reception. That is, in relation to allowing a receiver UE to derive a PSFCH resource for the HARQ ACK/NACK feedback in response to the corresponding PSSCH reception, a base station, a sidelink transmitter UE, or a sidelink scheduler UE may indicate whether to apply a configured UE specific PSFCH offset value.

Whether the corresponding UE specific PSFCH offset is applied may be indicated over a PDCCH or a PSCCH by being included in DCI or SCI for transmitting any PSSCH resource allocation information. In this case, in one embodiment, an information area for indicating whether the corresponding UE specific PSFCH offset is applied may be included in a DCI format or a SCI format including resource allocation information for the PSSCH.

In another embodiment, when transmitting a DCI format or a SCI format including PSSCH allocation information, whether the UE specific PSFCH offset is applied may be implicitly indicated as a function of an RNTI scrambled in CRC, a search space/CORESET over which a DCI format or a SCI format is transmitted, a PSCCH resource pool, or the like.

In another embodiment, whether the UE specific PSFCH offset is applied may be semi-statically configured for a receiver UE through higher layer signaling. In another embodiment, whether the UE specific PSFCH offset is applied may be activated or deactivated through MAC CE signaling.

The transmitter UE may receive HARQ ACK/NACK feedback information for the PSSCH using the PSFCH resource determined in the receiver UE.

Hereinbefore, embodiments will be described based on a situation where a transmitter UE receives HARQ ACK/NACK feedback information; however, without departing from the spirit and the scope of the present disclosure, the embodiments of the present disclosure may be substantially equally applied in a situation where the transmitter UE that has transmitted a PSSCH is replaced by a base station.

According to the above description, it is possible to provide methods and apparatuses for transmitting sidelink HARQ feedback information for enabling a radio resource for transmitting the sidelink HARQ feedback information to be allocated in the NR.

Hereinafter, radio resource configuration and allocation for transmitting sidelink HARQ feedback information in the NR in accordance with embodiments of the present disclosure will be described with reference to related drawings.

According to methods of transmitting/receiving sidelink for providing the V2X service in the LTE system, data transmission through sidelink communication has been performed based on the broadcast. That is, sidelink communication is performed in such a manner that when a transmitter UE broadcasts a sidelink radio channel or radio signal for transmitting to neighboring UEs without specifying a destination UE, neighboring UEs available to receive the corresponding broadcasting signal receive the corresponding signal. In such a manner, a HARQ procedure for the PSSCH that is a sidelink data channel has not been applied to the LTE V2X.

However, in case of the NR-based V2X, it is necessary to support sidelink transmission/reception based on the unicast or the groupcast, as well as the broadcast.

Like this, as a type of NR-based V2X communication, when a unicast or groupcast based sidelink transmission/reception method is defined, it is necessary to define a HARQ applying method for a corresponding sidelink radio channel, a channel status information (CSI) acquisition method for the sidelink, a link adaptation method, or the like.

In accordance with embodiments of the present disclosure, specific methods are introduced for applying the HARQ in data transmission/reception through the sidelink. In particular, in an environment where the groupcast for sidelink communication is applied, a resource allocation method is proposed for enabling a receiver UE to transmit HARQ ACK/NACK feedback information.

Resource allocation for direct communication between devices based on the previously defined sidelink may be performed in a distributed method or in a centralized method. That is, in one or more resource pools configured by a base station or pre-configured, a transmitter UE (a transmitting node) may select a radio resource, for example, a sub-channel for sidelink data transmission, and transmit a PSSCH and a PSCCH including scheduling control information on the PSSCH using the selected radio resource. Alternatively, a base station may transmit sidelink resource allocation information for a transmitter UE to the transmitter UE through a PDCCH, and the transmitter UE may transmit a corresponding PSCCH and PSSCH using the sidelink resource allocated by the base station. Like this, transmission mode 3 scheduled by a base station or distributed-based transmission mode 4 is defined as a method of transmitting radio data based on the sidelink.

Likewise, in the NR V2X, it is possible to define i) mode 1 in which a PSSCH transmission resource is allocated by a base station and ii) mode 2 in which a PSSCH transmission resource is allocated by a transmitter UE or a scheduler UE. Thus, when the unicast scheme or groupcast scheme is supported as a sidelink transmission method for the NR-based V2X, an unicast or groupcast link between one transmitter UE and one or more receiver UEs or between one master UE and one or more slave UEs is configured, and a PSSCH transmission resource over the configured link may be also scheduled by a base station or scheduled by the UE.

Like this, when performing PSSCH transmission based on the unicast or groupcast, a receiver UE that has received the corresponding PSSCH may feed back HARQ ACK/NACK feedback information in response to the PSSCH reception to a corresponding transmitter UE or scheduler UE, or a base station. Herein, a sidelink radio channel for corresponding HARQ ACK/NACK feedback may be referred to as a PSFCH. It should be noted that this defining is merely one example; therefore, embodiments of the present disclosure are not limited thereto. Other terms may be substantially equally used without departing from the spirit and the scope of the present disclosure.

In the present disclosure, a PSFCH resource allocation method is introduced for HARQ ACK/NACK feedback by a UE that has received a PSSCH through sidelink communication. In particular, provided herein is a method of allocating PSFCH resources of UEs for groupcast based PSSCH reception.

Embodiment 1 A Configuration of a PSFCH Resource Pool or a PSFCH Resource Set A PSFCH resource pool may be configured for HARQ ACK/NACK feedback in response to the PSSCH reception of a UE. Corresponding resource pool configuration information may be configured with time-domain resource allocation information and frequency resource assignment information. The corresponding resource pool configuration information may be configured through cell-specific or UE-specific higher layer signaling by a base station, or pre-configured. Alternatively, a transmitter UE or a scheduler may configure corresponding resource pool configuration information and then transmit the corresponding resource pool configuration information to a receiver UE over a sidelink radio channel, such as a PSDCH, a PSCCH, a PSSCH, or the like.

A PSFCH resource pool may be configured to be associated with a PSSCH resource pool configuration. A PSFCH resource pool may be configured to be associated with a PSCCH resource pool configuration.

A PSFCH resource for allowing a receiver UE to perform HARQ ACK/NACK feedback in response to PSSCH reception may be allocated using a configured PSFCH resource pool. At this time, PSFCH resource allocation information in the PSFCH resource pool may be explicitly signaled or implicitly signaled.

A PSFCH resource set may be configured for allowing a receiver UE to perform HARQ ACK/NACK feedback in response to PSSCH reception. A base station may configure the corresponding PSFCH resource set and then transmit the corresponding PSFCH resource set through cell-specific or UE-specific higher layer signaling. Or, a transmitter UE or a scheduler UE may configure and transmit the corresponding PSFCH resource set over a sidelink radio channel, such as a PSDCH, a PSCCH, a PSSCH, or the like.

A PSFCH resource for allowing a receiver UE to perform HARQ ACK/NACK feedback in response to PSSCH reception may be allocated using a configured PSFCH resource set. At this time, PSFCH resource allocation information in the corresponding PSFCH resource set may be explicitly signaled or implicitly signaled.

Embodiment 2 A UE-Specific Offset Configuration for Groupcast

A PSFCH resource is to be used for allowing a receiver UE to perform HARQ ACK/NACK feedback in response to PSSCH reception, among PSFCHs included in the PSFCH resource pool. Such a PSFCH resource or the PSFCH resource set described above may be explicitly signaled by a base station, a sidelink transmitter UE, or a sidelink scheduler UE, or implicitly signaled. When the PSFCH resource is explicitly signaled, the base station, the sidelink transmitter UE, or the sidelink scheduler UE may transmit the PSFCH resource over a PDCCH or a PSCCH by being included in DCI or sidelink control information (SCI). When the PSFCH resource is implicitly signaled, the PSFCH resource may be allocated as a function of a resource pool over which PSSCH or PSCCH transmission has been performed, a resource index over which the corresponding PSSCH or PSCCH transmission has been performed in the corresponding resource pool, or the like. For example, the resource index may include a sub-channel index, a sidelink control channel element index, or the like, or may include a basic unit for PSCCH or PSSCH transmission.

When the PSSCH transmission is performed based on the groupcast, since a plurality of receiver UEs shares one or more PSFCH(s) that is(are) provided by one explicit or implicit signaling, there is a possibility of a collision of PSFCH transmission resources for HARQ ACK/NACK feedback between the plurality of receiver UEs.

In order to prevent such a collision, a method is provided of applying UE-specific offset in relation to allocating a PSFCH resource for allowing a sidelink UE to perform HARQ ACK/NACK feedback. In relation to receiving PSFCH resources for HARQ ACK/NACK feedback in response to PSSCH reception, UEs may apply respective UE specific offset values to PSFCH resource information explicitly or implicitly signaled by a base station, a sidelink transmitter UE, or a sidelink scheduler UE. Based on this, UEs may derive respective final PSFCH resources for HARQ ACK/NACK feedback.

For example, when PSFCH resource allocation information for one or more UE(s) is indicated using an ACK resource indicator (ARI) information area included in DCI or SCI for transmitting scheduling information for a PSSCH, each UE may derive final PSFCH resource information by adding a UE-specific PSFCH offset value set for each UE to PSFCH resource information (e.g. PSFCH index) indicated by the ARI. Likewise, when PSFCH resource information is implicitly derived, a UE-specific PSFCH offset value may be included as one parameter of a corresponding implicit PSFCH resource deriving function.

In one embodiment, the UE specific PSFCH offset value may be set by a base station for each UE through UE specific higher layer signaling, MAC CE signaling, L1 control signaling, or the like. In another embodiment, when a groupcast session is established, UE specific PSFCH offset values may be set by a base station, a sidelink transmitter UE, or a sidelink scheduler UE, and then, transmitted to respective UEs. In further another embodiment, when groupcast-based PSSCH resources are allocated, the UE specific PSFCH offset values may be transmitted to respective UEs over a PDCCH or a PSCCH.

In yet another embodiment, the UE specific PSFCH offset value may implicitly set as a function of each UE ID, or the like. For example, the UE specific PSFCH offset value may be derived as a function of a C-RNTI of a UE. In yet another embodiment, a UE ID for sidelink transmission/reception is defined, and as a result, a corresponding UE specific PSFCH offset value may be derived. In this case, the UE ID for corresponding sidelink transmission/reception may be a UE ID of a higher layer, or the UE ID may be in the form of a destination ID as a target of corresponding unicast or groupcast data transmission or a source ID. Alternatively, the UE ID for corresponding sidelink transmission/reception may be a sidelink physical layer ID, or the like for PSCCH reception, such as a SL-RNTI.

The UE ID for the corresponding sidelink transmission/reception may set by a base station and then allocated through UE specific higher layer signaling, or the UE ID may be set by a sidelink transmitter UE or a sidelink scheduler UE and then transmitted over a sidelink radio channel, such as a PSDCH, a PSCCH, a PSSSCH, or the like. UE specific PSFCH offset information for each sidelink receiver UE may be transmitted to a groupcast PSSCH transmitter UE. Specifically, the UE specific PSFCH offset information for each receiver UE may be transmitted by a base station to a groupcast PSSCH transmitter UE through higher layer signaling or MAC CE signaling, or transmitted by a scheduler UE to a corresponding groupcast PSSCH transmitter UE over a sidelink radio channel.

Further, whether configured UE specific PSFCH offset is introduced may be additionally indicated in relation to allocating a PSFCH resource for HARQ ACK/NACK feedback in response to the reception of a PSSCH. That is, in relation to allowing a PSSCH receiver UE to derive a PSFCH resource for the HARQ ACK/NACK feedback in response to the corresponding PSSCH reception, a base station, a sidelink transmitter UE, or a sidelink scheduler UE may indicate whether to apply a configured UE specific PSFCH offset value.

Whether the corresponding UE specific PSFCH offset is applied may be indicated over a PDCCH or a PSCCH by being included in DCI or SCI for transmitting any PSSCH resource allocation information. Specifically, an information area for indicating whether the corresponding UE specific PSFCH offset is applied, for example, a 1-bit indicator, may be defined in a DCI format or a SCI format including resource allocation information on the PSSCH, and whether the corresponding UE-specific PSFCH offset is applied may be explicitly indicated using the defined information area (e.g., the indicator).

In another embodiment, without defining a separate indicating information area, when transmitting a DCI format or a SCI format including corresponding PSSCH allocation information, whether the UE specific PSFCH offset is applied may be implicitly indicated as a function of an RNTI scrambled in CRC, a search space/CORESET over which the DCI format or the SCI format is transmitted, a PSCCH resource pool, or the like.

In further another embodiment, whether the UE specific PSFCH offset is applied may be semi-statically configured for a UE through higher layer signaling. In yet another embodiment, whether the UE specific PSFCH offset is applied may be activated or deactivated through MAC CE signaling.

Further, the above description may be applicable irrespective of a specific PSFCH channel structure. For example, when feedback information is directly transmitted to a UE over a sidelink, a corresponding PSFCH may reuse a structure of the PSCCH or a structure of the PUCCH, or be designed based on this or newly designed. However, embodiments of the present disclosure are not limited thereto. Likewise, when feedback information is transmitted to a base station over a uu link, a corresponding PSFCH may reuse a structure of the PUCCH or be designed in a new form. However, embodiments of the present disclosure are not limited thereto.

According to the above description, it is possible to provide methods and apparatuses for transmitting sidelink HARQ feedback information for enabling a radio resource for transmitting the sidelink HARQ feedback information to be allocated in the NR.

Hereinafter, configurations of a receiver UE and a transmitter UE capable of performing a part or all of the embodiments described with reference to FIGS. 1 to 15 will be discussed with reference to the drawings.

Figure 16:
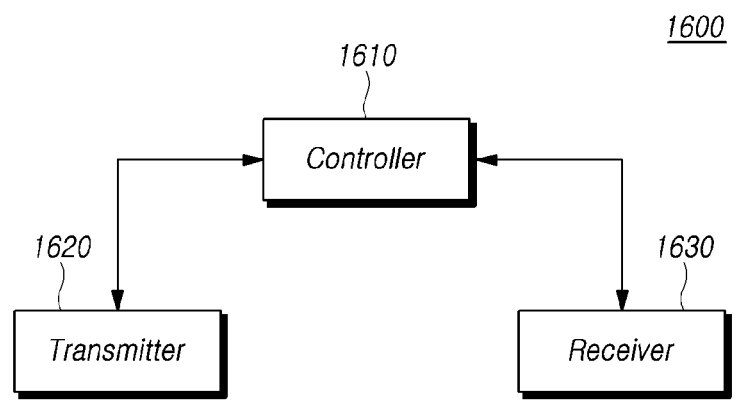
FIG. 16 is a block diagram illustrating a receiver UE according to embodiments of the present disclosure.

FIG. 16 is a block diagram illustrating a receiver UE 1600 according to an embodiment of the present disclosure.

Referring to FIG. 16, the receiver UE 1600 according to an embodiment includes a receiver 1610, a controller 1620, and a transmitter 1630.

The controller 1610 controls overall operations of the receiver UE 1600 according to methods of the receiver UE for transmitting HARQ feedback information needed to perform the embodiments of the present described above. The transmitter 1620 transmits UL control information and data, messages over a corresponding channel to a base station, a transmitter UE, or a sidelink scheduler UE. The receiver 1630 receives DL control information and data, messages over a corresponding channel from a base station, a transmitter UE, or a sidelink scheduler UE.

The receiver 1610 may receive configuration information on a PSFCH resource set. When a PSSCH is received based on sidelink communication, the transmitter 1620 of the receiver UE may transmit HARQ ACK/NACK feedback information corresponding to the received PSSCH.

The configuration information on the PSFCH resource set or a PSFCH resource pool may be configured through cell-specific or UE-specific higher layer signaling by a base station, or pre-configured. Alternatively, the receiver 1630 may receive configuration information on a PSFCH resource set or a PSFCH resource pool configured by a transmitter UE or a scheduler UE over a sidelink radio channel, such as a PSDCH, a PSCCH, a PSSCH, or the like.

In one embodiment, the PSFCH resource pool may be configured to be associated with a PSCCH or PSSCH resource pool configuration. In this case, timing gap related information between a sidelink slot over which each PSSCH or PSCCH resource pool is configured and a sidelink slot over which a PSFCH resource pool corresponding to the slot for configuring the PSSCH or PSCCH resource pool is configured may be included as configuration information on the PSFCH resource pool.

When the PSSCH is received from the transmitter UE, the controller 1610 may determine a PSFCH resource used for transmitting HARQ feedback information for the PSSCH based on certain identification information in the PSFCH resource set. In one embodiment, a PSFCH resource is to be used for allowing the receiver UE to perform HARQ ACK/NACK feedback in response to PSSCH reception, among PSFCHs included in the PSFCH resource pool. Such a PSFCH resource or the PSFCH resource set may be implicitly signaled. In this case, the controller 1610 may determine the PSFCH resource as a function of a sub-channel index for a sub-channel over which PSCCH or PSSCH transmission has been performed.

In one embodiment, when the PSSCH transmission is performed based on the groupcast, if a plurality of receiver UEs shares one or more PSFCH(s) that is (are) provided by one implicit signaling, there is a possibility of a collision of PSFCH transmission resources for HARQ ACK/NACK feedback between the plurality of receiver UEs. In order to prevent such a collision, UE-specific offset may be applied in relation to allocating PSFCH resources for allowing sidelink UEs to perform HARQ ACK/NACK feedback. The controller 1610 may derive a final PSFCH resource for HARQ ACK/NACK feedback by applying a UE specific offset value (e.g., set for each UE) to PSFCH resource information implicitly signaled by a base station, a sidelink transmitter UE, or a sidelink scheduler UE.

In one embodiment, the UE specific PSFCH offset value may implicitly set as a function of each UE ID, or the like. In another embodiment, a UE ID for sidelink transmission/reception is defined. As a result, a corresponding UE specific PSFCH offset value may be derived. In this case, the UE ID for corresponding sidelink transmission/reception may be a UE ID of a higher layer that is a group ID (a member ID) for a group including a receiver UE in groupcast data transmission. Alternatively, the UE ID may be in the form of a destination ID as a target of corresponding unicast or groupcast data transmission or a source ID as an identifier of a transmitter UE. Alternatively, the UE ID may be a sidelink physical layer ID, or the like for PSCCH reception, such as a SL-RNTI.

The UE ID for sidelink transmission/reception may set by a base station and then allocated through UE specific higher layer signaling, or the UE ID may be set by a sidelink transmitter UE or a sidelink scheduler UE and then transmitted over a sidelink radio channel, such as a PSDCH, a PSCCH, a PSSSCH, or the like. UE specific PSFCH offset information for each sidelink receiver UE may be transmitted to a groupcast PSSCH transmitter UE. Specifically, the UE specific PSFCH offset information for each receiver UE may be transmitted by a base station to a groupcast PSSCH transmitter UE through higher layer signaling or MAC CE signaling, or the UE specific PSFCH offset information may be transmitted by a scheduler UE to a corresponding groupcast PSSCH transmitter UE over a sidelink radio channel.

In one embodiment, whether the UE specific PSFCH offset is applied may be additionally indicated in relation to allocating a PSFCH resource for HARQ ACK/NACK feedback in response to PSSCH reception. That is, in relation to allowing the controller 1610 to derive a PSFCH resource for the HARQ ACK/NACK feedback in response to the corresponding PSSCH reception, a base station, a sidelink transmitter UE, or a sidelink scheduler UE may indicate whether to apply a configured UE specific PSFCH offset value.

Whether the corresponding UE specific PSFCH offset is applied may be indicated over a PDCCH or a PSCCH by being included in DCI or SCI for transmitting any PSSCH resource allocation information. In this case, in one embodiment, an information area for indicating whether the corresponding UE specific PSFCH offset is applied may be included in a DCI format or a SCI format including resource allocation information for the PSSCH.

In another embodiment, when transmitting a DCI format or a SCI format including PSSCH allocation information, whether the UE specific PSFCH offset is applied may be implicitly indicated as a function of an RNTI scrambled in CRC, a search space/CORESET over which a DCI format or a SCI format is transmitted, a PSCCH resource pool, or the like.

In further another embodiment, whether the UE specific PSFCH offset is applied may be semi-statically configured for a receiver UE through higher layer signaling. In yet another embodiment, whether the UE specific PSFCH offset is applied may be activated or deactivated through MAC CE signaling.

The transmitter 1620 may transmit HARQ feedback information using the PSFCH resource. The transmitter 1620 may transmit HARQ ACK/NACK feedback information in response to the received PSSCH using the determined PSFCH resource. In this case, the transmitter 1620 may transmit the HARQ ACK/NACK feedback information to a base station or a transmitter UE that has transmitted the PSSCH.

According to the above description, it is possible to provide methods and apparatuses for transmitting sidelink HARQ feedback information for enabling a radio resource for transmitting the sidelink HARQ feedback information to be allocated in the NR in accordance with embodiments of the present disclosure.

Figure 17:
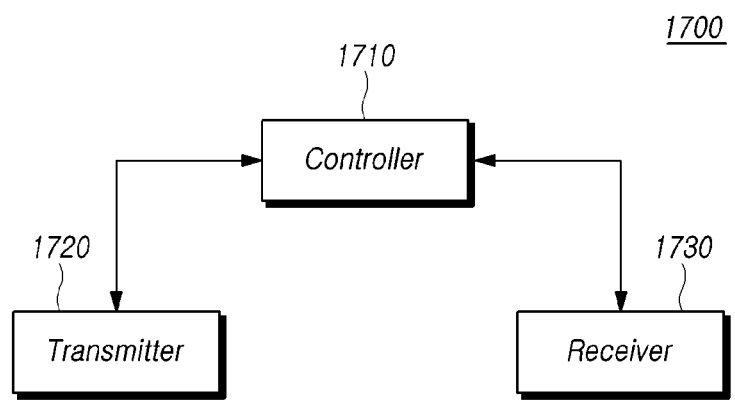
FIG. 17 is a block diagram illustrating a transmitter UE according to embodiments of the present disclosure.

FIG. 17 is a block diagram illustrating a transmitter UE 1700 according to an embodiment of the present disclosure.

Referring to FIG. 17, the transmitter UE 1700 according to an embodiment includes a controller 1710, a transmitter 1720, and a receiver 1730.

The controller 1710 controls overall operations of the transmitting UE 1700 according to methods of the transmitter UE for receiving HARQ feedback information needed to perform the embodiments of the present described above. The transmitter 1720 is used to transmit signals, messages, and data necessary for carrying out some embodiments as described above to a UE. The receiver 1730 is used to receive signals, messages, and data necessary for carrying out some embodiments as described above from a UE.

The transmitter 1720 may transmit a PSSCCH to a receiver UE. When the PSSCH is transmitted based on sidelink communication, the receiver 1730 may receive HARQ ACK/NACK feedback information corresponding to the transmitted PSSCH from the receiver UE. To do this, a PSFCH resource set or a PSFCH resource pool may be configured for transmitting the HARQ ACK/NACK feedback information in response to the PSSCH reception.

A base station may configure or pre-configure configuration information on the PSFCH resource set or the PSFCH resource pool through cell-specific or UE-specific higher layer signaling. Alternatively, a transmitter UE or a scheduler UE may configure and transmit configuration information on the PSFCH resource set or the PSFCH resource pool to the receiver UE over a sidelink radio channel, such as a PSDCH, a PSCCH, a PSSCH, or the like.

That is, in one embodiment, when the configuration information on the PSFCH resource set or the PSFCH resource pool is configured by the transmitter UE and then transmitted, the procedure of FIG. 15 may further include an operation in which that the transmitter UE transmits configuration information on a sidelink feedback channel (physical sidelink feedback channel (PSFCH)) resource set.

In one embodiment, the PSFCH resource pool may be configured to be associated with a PSCCH or PSSCH resource pool configuration. In this case, the PSFCH resource pool may include timing gap related information between i) a sidelink slot over which each PSSCH or PSCCH resource pool is configured and ii) a sidelink slot over which a PSFCH resource pool corresponding to the slot for configuring the PSSCH or PSCCH resource pool is configured, as configuration information on the PSFCH resource pool.

The receiver 1730 may receive HARQ feedback information for the PSSCH using a PSFCH resource determined in the receiver UE based on certain identification information in a PSFCH resource set, at step S1510.

When the PSSCH is transmitted from the transmitter 1720, the receiver UE may determine the PSFCH resource used for transmitting HARQ feedback information for the PSSCH based on certain identification information in the PSFCH resource set. In one embodiment, the PSFCH resource is to be used for allowing the receiver UE to perform HARQ ACK/NACK feedback in response to PSSCH reception, among PSFCHs included in the PSFCH resource pool, and the PSFCH resource or the PSFCH resource set may be implicitly signaled. In this case, the receiver UE may determine the PSFCH resource as a function of a sub-channel index for a sub-channel over which PSCCH or PSSCH transmission has been performed.

In one embodiment, when the PSSCH transmission is performed based on the groupcast, if a plurality of receiver UEs shares one or more PSFCH(s) that is (are) provided by one implicit signaling, there is a possibility of a collision of PSFCH transmission resources for HARQ ACK/NACK feedback between the plurality of receiver UEs. In order to prevent such a collision, UE-specific offset may be applied in relation to allocating PSFCH resources for allowing sidelink UEs to perform HARQ ACK/NACK feedback. The receiver UE may derive a final PSFCH resource for HARQ ACK/NACK feedback by applying a UE specific offset value (e.g., set for each UE) to PSFCH resource information implicitly signaled by a base station, a sidelink transmitter UE, or a sidelink scheduler UE.

In one embodiment, the UE specific PSFCH offset value may implicitly set as a function of each UE ID, or the like. In another embodiment, a UE ID for sidelink transmission/reception is defined. As a result, a corresponding UE specific PSFCH offset value may be derived. In this case, the UE ID for corresponding sidelink transmission/reception may be a UE ID of a higher layer that is a group ID (a member ID) for a group including a receiver UE in groupcast data transmission. Alternatively, the UE ID may be in the form of a destination ID as a target of corresponding unicast or groupcast data transmission or a source ID as an identifier of a transmitter UE. Alternatively, the UE ID for corresponding sidelink transmission/reception may be a sidelink physical layer ID, or the like for PSCCH reception, such as a SL-RNTI.

The UE ID for sidelink transmission/reception may set by a base station and then allocated through UE specific higher layer signaling. Or, the UE ID may be set by a sidelink transmitter UE or a sidelink scheduler UE and then transmitted over a sidelink radio channel, such as a PSDCH, a PSCCH, a PSSSCH, or the like. The receiver 1730 may receive UE specific PSFCH offset information for each sidelink receiver UE. Specifically, the receiver 1730 may receive UE specific PSFCH offset information for each receiver UE from a base station through higher layer signaling, MAC CE signaling, or L1 control signaling, or receive from a scheduler UE over a sidelink radio channel.

In one embodiment, whether the UE specific PSFCH offset is applied may be additionally indicated in relation to allocating a PSFCH resource for HARQ ACK/NACK feedback in response to PSSCH reception. That is, in relation to allowing a receiver UE to derive a PSFCH resource for the HARQ ACK/NACK feedback in response to the corresponding PSSCH reception, a base station, a sidelink transmitter UE, or a sidelink scheduler UE may indicate whether to apply a configured UE specific PSFCH offset value.

Whether the corresponding UE specific PSFCH offset is applied may be indicated over a PDCCH or a PSCCH by being included in DCI or SCI for transmitting any PSSCH resource allocation information. In this case, in one embodiment, an information area for indicating whether the corresponding UE specific PSFCH offset is applied may be included in a DCI format or a SCI format including resource allocation information for the PSSCH.

In another embodiment, when transmitting a DCI format or a SCI format including PSSCH allocation information, whether the UE specific PSFCH offset is applied may be implicitly indicated as a function of an RNTI scrambled in CRC, a search space/CORESET over which a DCI format or a SCI format is transmitted, a PSCCH resource pool, or the like.

In further another embodiment, whether the UE specific PSFCH offset is applied may be semi-statically configured for a receiver UE through higher layer signaling. In yet another embodiment, whether the UE specific PSFCH offset is applied may be activated or deactivated through MAC CE signaling.

The receiver 1730 may receive HARQ ACK/NACK feedback information for the PSSCH using the PSFCH resource determined in the receiver UE.

It should be noted that the above discussions are conducted based on a transmitter UE; however, embodiments of the present disclosure are not limited thereto. The above embodiments may be substantially equally applied to a sidelink scheduler UE or a base station as well without departing from the spirit and the scope of the present disclosure.

In accordance with the embodiments described above, it is possible to provide methods and apparatuses for transmitting sidelink HARQ feedback information for enabling a radio resource for transmitting the sidelink HARQ feedback information to be allocated in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a receiver user equipment (UE) for transmitting hybrid automatic repeat request (HARQ) feedback information, the method comprising:
receiving configuration information on a physical sidelink feedback channel (PSFCH) resource set;
receiving a physical sidelink shared channel (PSSCH) from a transmitter UE;
receiving a source identifier (ID) of the transmitter UE through the PSSCH from the transmitter UE;
determining a PSFCH resource used for transmitting the HARQ feedback information in response to the PSSCH in the PSFCH resource set; and
transmitting the HARQ feedback information using the PSFCH resource,
wherein the PSFCH resource is determined based on the received source ID of the transmitter UE.

2. The method according to claim 1, wherein the PSFCH resource is determined further based on a sub-channel index for a sub-channel used for the reception of the PSSCH.

3. The method according to claim 1, wherein the PSFCH resource is determined further based on a member identifier (ID) of the receiver UE receiving the PSSCH according to a groupcast transmission from the transmitter UE.

4. The method according to claim 1, wherein the configuration information on the PSFCH resource set includes timing gap information between the reception of the PSSCH and the transmission of the HARQ feedback information in response to the reception of the PSSCH.

5. A method of a transmitter user equipment (UE) for receiving hybrid automatic repeat request (HARQ) feedback information, the method comprising:
transmitting a physical sidelink shared channel (PSSCH) to a receiver UE;
transmitting a source identifier (ID) of the transmitter UE through the PSSCH to the receiver UE; and
receiving the HARQ feedback information in response to the PSSCH using a physical sidelink feedback channel (PSFCH) resource in a PSFCH resource set,
wherein the PSFCH resource is determined based on the transmitted source ID of the transmitter UE.

6. The method according to claim 5, wherein the PSFCH resource is determined further based on a sub-channel index for a sub-channel used for the transmission of the PSSCH.

7. The method according to claim 5, wherein the PSFCH resource is determined further based on a member identifier (ID) of the receiver UE receiving the PSSCH according to a groupcast transmission from the transmitter UE.

8. The method according to claim 5, wherein configuration information on the PSFCH resource set includes timing gap information between the transmission of the PSSCH and the reception of the HARQ feedback information in response to the transmission of the PSSCH.

9. A receiver user equipment (UE) for transmitting hybrid automatic repeat request (HARQ) feedback information, the receiver UE comprising:
a receiver configured to receive configuration information on a physical sidelink feedback channel (PSFCH) resource set, receive a physical sidelink shared channel (PSSCH) from a transmitter UE, and receive a source identifier (ID) of the transmitter UE through the PSSCH from the transmitter UE;
a controller configured to determine a PSFCH resource used for transmitting the HARQ feedback information in response to the PSSCH in the PSFCH resource set; and
a transmitter configured to transmit the HARQ feedback information using the PSFCH resource,
wherein the PSFCH resource is determined based on the received source ID of the transmitter UE.

10. The receiver UE according to claim 9, wherein the PSFCH resource is determined further based on a sub-channel index for a sub-channel used for the reception of the PSSCH.

11. The receiver UE according to claim 9, wherein the PSFCH resource is determined further based on a member identifier (ID) of the receiver UE receiving the PSSCH according to a groupcast transmission from the transmitter UE.

12. The receiver UE according to claim 9, wherein the configuration information on the PSFCH resource set includes timing gap information between the reception of the PSSCH and the transmission of the HARQ feedback information in response to the reception of the PSSCH.

* * * * *